United States Patent
Venkatachalam et al.

(10) Patent No.: US 9,141,486 B2
(45) Date of Patent: Sep. 22, 2015

(54) INTELLIGENT I/O CACHE REBUILD IN A STORAGE CONTROLLER

(71) Applicant: LSI Corporation, San Jose, CA (US)

(72) Inventors: Ramkumar Venkatachalam, Bangalore (IN); Sumanesh Sethuramachar Samanta, Bangalore (IN); Srikanth Sethuramachar Krishnamurthy, Bangalore (IN)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 108 days.

(21) Appl. No.: 14/179,667

(22) Filed: Feb. 13, 2014

(65) Prior Publication Data

US 2015/0199244 A1 Jul. 16, 2015

Related U.S. Application Data

(60) Provisional application No. 61/927,892, filed on Jan. 15, 2014.

(51) Int. Cl.
*G06F 11/00* (2006.01)
*G06F 11/16* (2006.01)
*G06F 12/08* (2006.01)
*G06F 11/20* (2006.01)

(52) U.S. Cl.
CPC ............ *G06F 11/1666* (2013.01); *G06F 11/20* (2013.01); *G06F 12/0802* (2013.01); *G06F 12/0866* (2013.01)

(58) Field of Classification Search
CPC . G06F 12/0866; G06F 11/1666; G06F 11/20; G06F 12/0802; G06F 12/0873; G06F 12/0895; G06F 2211/1009; G06F 2212/285; G06F 2212/401
See application file for complete search history.

(56) References Cited

U.S. PATENT DOCUMENTS

| | | | |
|---|---|---|---|
| 5,392,445 A * | 2/1995 | Takamoto et al. | 711/114 |
| 5,809,320 A * | 9/1998 | Jain et al. | 712/34 |
| 6,591,335 B1 * | 7/2003 | Sade et al. | 711/113 |
| 7,552,282 B1 * | 6/2009 | Bermingham et al. | 711/119 |
| 7,644,108 B1 * | 1/2010 | Malmskog | 709/203 |
| 2001/0052100 A1 * | 12/2001 | Miki | 714/768 |
| 2002/0007402 A1 * | 1/2002 | Huston et al. | 709/217 |
| 2007/0233948 A1 * | 10/2007 | Fukuyama | 711/113 |
| 2008/0250210 A1 | 10/2008 | Ash | |
| 2009/0228646 A1 | 9/2009 | Edwards | |
| 2010/0070718 A1 | 3/2010 | Pong | |
| 2011/0153953 A1 * | 6/2011 | Khemani et al. | 711/136 |
| 2012/0303862 A1 | 11/2012 | Benhase | |
| 2012/0303864 A1 | 11/2012 | Benhase | |
| 2012/0303876 A1 | 11/2012 | Benhase | |
| 2013/0067179 A1 | 3/2013 | Paleologu | |
| 2013/0124801 A1 | 5/2013 | Natrajan | |
| 2015/0135003 A1 * | 5/2015 | Cota-Robles et al. | 714/6.3 |

* cited by examiner

*Primary Examiner* — Charles Ehne
(74) *Attorney, Agent, or Firm* — Duft Bornsen & Fettig LLP; Gregory T. Fettig

(57) ABSTRACT

Systems and methods presented herein provide for redundancy in I/O caching. In one embodiment, a storage controller includes a first cache operable to receive input/output requests between a host system and a storage device, to compress data of the input/output requests, and to cache the compressed data before writing to the storage device. The storage controller also includes a second cache operable to track chunks of the compressed data in the first cache. When the first cache fails, the second cache is operable to cache the tracked chunks of the compressed data that have not been written to the storage device in a third cache while leaving chunks of data in the second cache that have been written to the storage device.

18 Claims, 6 Drawing Sheets

INTELLIGENT I/O CACHE REBUILD IN A STORAGE CONTROLLER

CROSS REFERENCE TO RELATED APPLICATIONS

This document claims priority to, and thus the benefit of an earlier filing date from, U.S. Provisional Patent Application No. 61/927,892 (filed on Jan. 15, 2014) entitled "INTELLIGENT I/O CACHE REBUILD IN A STORAGE CONTROLLER", which is hereby incorporated by reference.

FIELD OF THE INVENTION

The invention generally relates to field of storage controllers.

BACKGROUND

Solid-state drive (SSD) storage devices are used in storage controllers to cache input/output (I/O) requests before writing to long-term storage devices in what is known as a writeback caching scheme. Some storage controllers employ multiple SSDs for fault tolerance in case one of the SSDs fails. Often, the SSD is configured to compress data before it is stored so that it can store more data than its physical capacity and reduce the number of overall wear-producing writes to its memory cells. For example, in Dynamic Logical Capacity (DLC), incoming data is compressed and stored in memory cells of the SSD. Thin Provisioning in the storage controller monitors the amount of free physical space to ensure that the SSD does not run out of storage space to provide. However, when the DLC SSD fails, a conventional rebuild of the DLC SSD into another DLC SSD can exceed the physical capacity of the other DLC SSD because in the conventional rebuild data is blindly and holistically copied from one disk to another without regard to whether data is valid. And, the combination of both valid and invalid data from the first DLC SSD can exceed the physical capacity of the later.

SUMMARY

Systems and methods presented herein provide for redundancy in I/O caching. In one embodiment, a storage controller includes a first cache operable to receive input/output requests between a host system and a storage device, to compress data of the input/output requests, and to cache the compressed data before writing to the storage device. The storage controller also includes a second cache operable to track chunks of the compressed data in the first cache. When the first cache fails, the second cache is operable to cache the tracked chunks of the compressed data that have not been written to the storage device in a third cache while leaving chunks of data in the second cache that have been written to the storage device.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
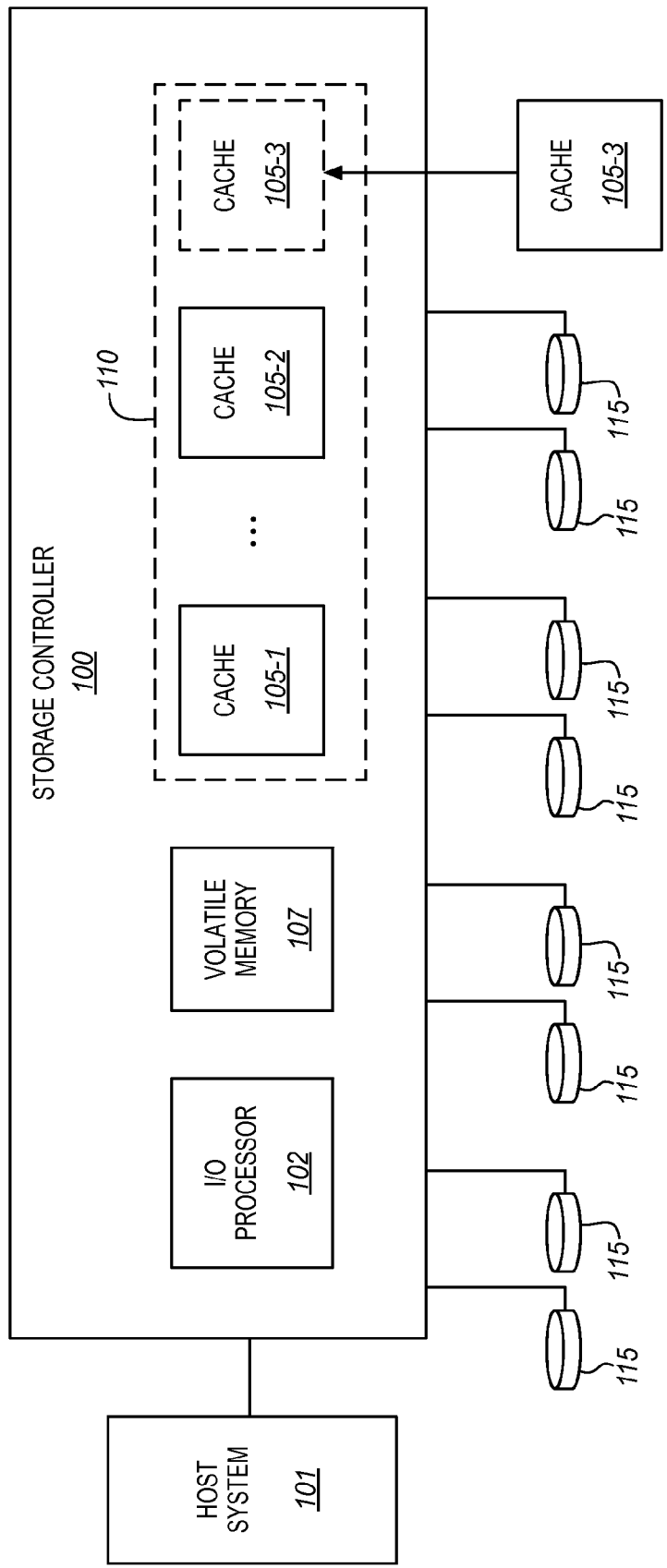
FIG. 1 is a block diagram of an exemplary storage controller.

FIG. 1 is a block diagram of an exemplary storage controller 100. The storage controller 100 is operable to interface between a host system 101 and one or more storage devices 115 (e.g., longer-term storage hard disk drives, SSDs, or the like) to provide storage operations for the host system 101. The storage controller 100 processes I/O requests from the host system 101 via an I/O processor 102 to read data from and write data to the storage devices 115. The I/O processor 102 may be configured to perform a writeback caching operation via the caches 105-1-105-2. In writeback caching, a write I/O request to the storage device 115 is postponed until a cache (e.g., the caches 105-1-105-2) containing data is about to be modified or replaced by newer incoming content. The cache tracks which of its locations have been written over and marks them as "dirty" for later writing to the storage devices 115. The data in these locations is "written back" to the storage devices 115 when they are "evicted" from the cache. Additionally, the caches 105-1-105-2 may be operable to cache data from the storage devices 115 during read I/O requests until the data can be transferred to the host system 101.

In this embodiment, the cache 105-1 is a first cache and the cache 105-2 is a second cache, or backup cache, to provide redundancy for the first cache 105-1 if it fails. The first cache 105-1 compresses data of the write I/O requests. The second cache 105-2 also processes the write I/O requests and further keeps track of dirty chunks of that compressed data such that the second cache 105-2 can rebuild the first cache 105-1 when it fails. For example, when data is stored in the first cache 105-1, the second cache 105-2 may associate metadata with chunks of dirty data. When the first cache 105-1 fails (e.g., due to over-writing a cache configured from an SSD), the I/O processor 102 retrieves the metadata from the second cache 105-2. The I/O processor 102 may then transfer the metadata to volatile memory 107 (e.g., Dynamic Random Access Memory, "DRAM") and examine the metadata on a data chunk by data chunk basis to determine which chunks of data are dirty. When the I/O processor 102 identifies a chunk of data that is dirty, the I/O processor 102 transfers that chunk of dirty data to a third cache 105-3, while leaving the other chunks of data in the second cache 105-2. This process virtually assures that a rebuild of the data in the first cache 105-1 can be performed without exceeding the physical storage limits of the third cache 105-3 because the data of the first cache 105-1 is not blindly rebuilt to the third cache 105-3 in the event of failure of the first cache 105-1. Instead, desired data, such as valid data and dirty data, are written to the third cache 105-3.

The first and second caches 105-1 and 105-2 as shown herein are configured from the same nonvolatile memory 110 but may be configured in separate nonvolatile memories as a matter of design choice. For example, the caches 105-1 and 105-2 may be implemented in a single SSD where each of the caches 105-1 and 105-2 are virtual caches implemented via a type of partitioning of the SSD. Alternatively, the caches 105-1 and 105-2 may be implemented in separate SSDs (e.g., assuming the caches 105-1 and 105-2 are the same size).

Although shown and described with respect to rebuilding dirty data of the first cache 105-1 into the third cache 105-3, the invention is not intended to be so limited. In one embodiment, multiple caches 105 may be used to implement a Redundant Array of Independent Disks (RAID) storage management of the writeback I/O requests. For example, three or more caches 105 may be used to implement RAID striping techniques and parity. In this type of writeback caching, some of the data chunks would be deemed as "valid" data chunks. The I/O processor 102, in this embodiment, would retrieve the metadata and transfer the metadata to the volatile memory 107. The processor 102 would then compare data chunks to other caches 105 in the nonvolatile memory 110 to identify valid stripes. An example of such an embodiment is shown and described below in greater detail.

Generally, the storage controller 100 is any device, system, software, or combination thereof operable to process I/O requests to the storage devices 115 on behalf of the host system 101. The storage controller 100 may be configured with the host system 101 or as a separate component. The storage controller 100 may also be configured to interface with multiple host systems 101 and/or implement RAID management of data stored within the storage devices 115. Other details associated with the caching by the storage controller 100 are shown and described below beginning with FIG. 2.

Figure 2:
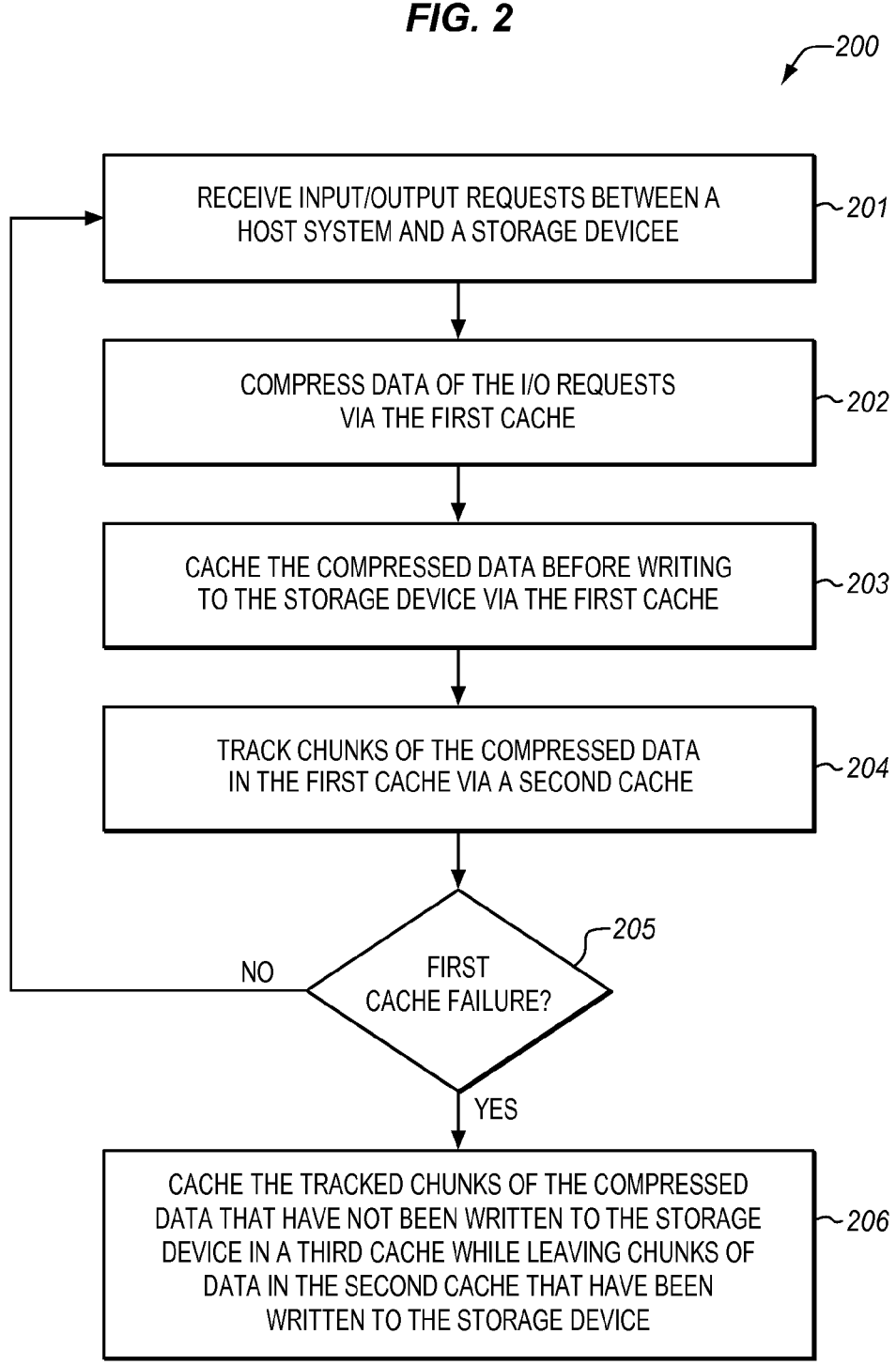
FIG. 2 is a flowchart of an exemplary process operable with the storage controller of FIG. 1.

FIG. 2 is a flowchart of an exemplary process operable with the storage controller 100. In this embodiment, the storage controller 100 receives I/O requests from the host system 101 with the first cache 105-1 between the host system 101 and one or more of the storage devices 115, in the process element 201. The first cache 105-1 compresses data of the I/O request, in the process element 202. The first cache 105-1 then caches the compressed data for subsequent writing to the storage device(s) 115, in the process element 203. The second cache 105-2 tracks chunks of the compressed data that have not yet been written to the storage device(s) 115 (e.g., by associating metadata with each chunk of data), in the process element 204.

After some point in time, the first cache 105-1 experiences a failure (process element 205). If the first cache 105-1 experiences a failure, the processor 101 retrieves and caches chunks of compressed data that have not yet been written to the storage device(s) 115 from the second cache 105-2 to the third cache 105-3 based on the tracking performed by the second cache 105-2, in the process element 206. Other chunks of data are left behind in the first cache 105-1, such as clean data that has already been written to the storage devices 115 and was ready for eviction from the caches 105-1 and 105-2. Other data that may be left behind may include invalid data chunks, such as those produced in a RAID management striping scheme as mentioned above.

Figure 3:
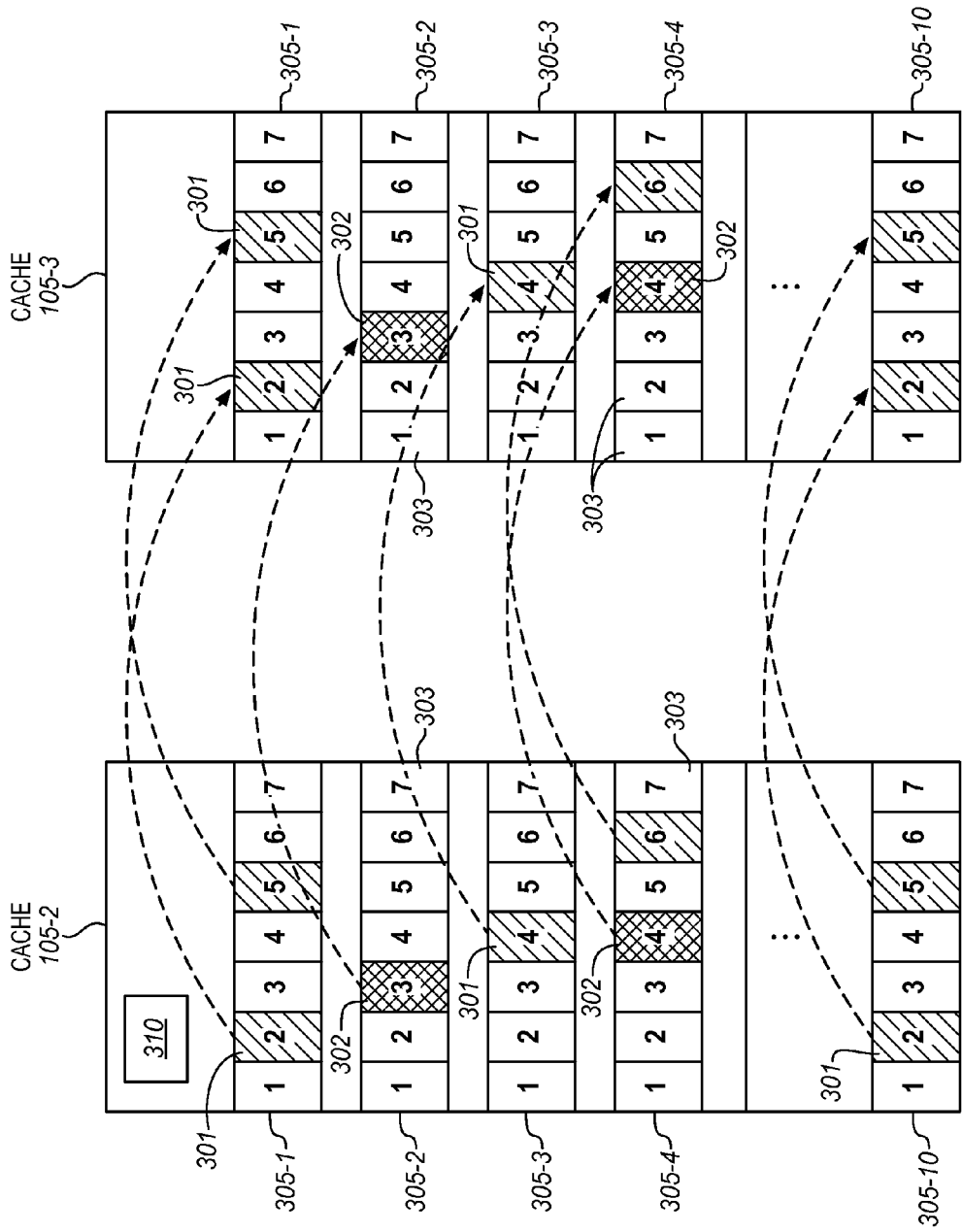
FIG. 3 is a block diagram of exemplary first and second I/O caches employing redundancy and RAID management.
Figure 4:
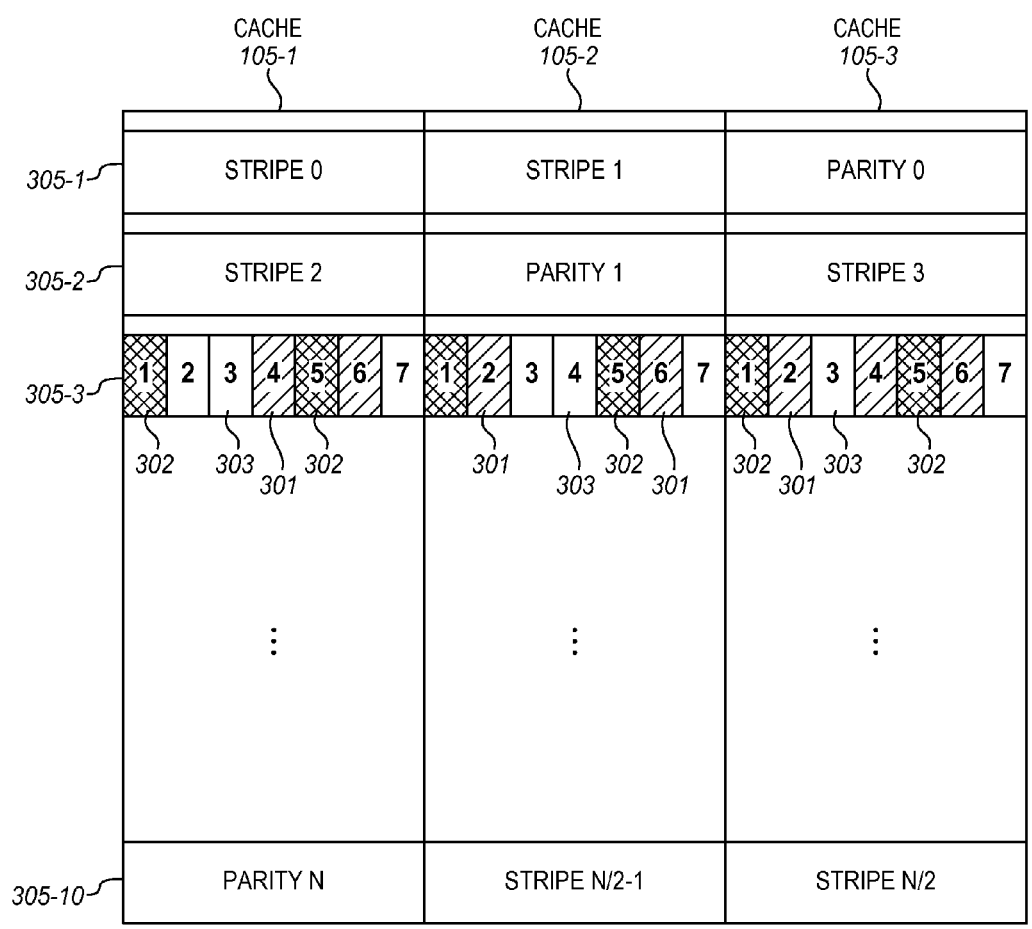
FIG. 4 is a block diagram of three exemplary I/O caches employing redundancy and RAID management.
Figure 5:
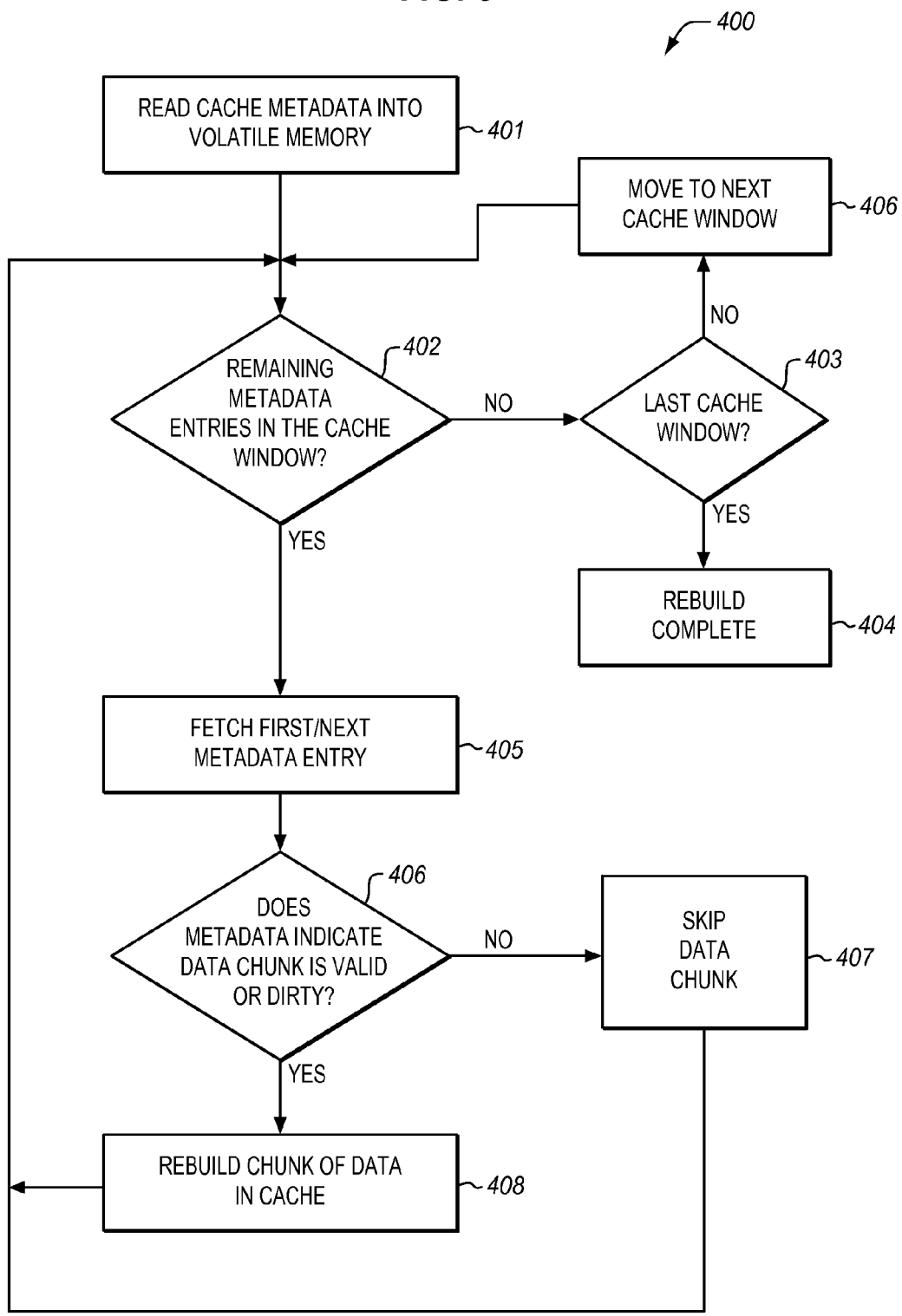
FIG. 5 is a flowchart of another exemplary process operable with the storage controller.

The next embodiments describe in greater detail how the chunks of data are transferred from one cache 105 to another cache 105. More specifically, FIG. 3 illustrates a RAID 1 mirroring configuration where the data of the first cache 105-1 is being rebuilt in the third cache 105-3 by the data in the second cache 105-2. FIG. 4 illustrates RAID 5 striping among three caches 105-1-105-3, and FIG. 5 is a flowchart describing a process operable with either of the exemplary embodiments illustrated in FIGS. 3 and 4.

In FIG. 3, the cache 105-2 mirrors the data in the cache 105-1. The compressed data stored in chunks in the cache 105-1 is also mirrored on cache 105-2 addressable by the cache windows 305. For example, the caches 105 may be divided into a plurality of cache windows 305-1-305-10 occupying a certain amount of storage space in the caches 105 (e.g., 1 MB to 4 MB). Each cache window may be further divided into a plurality of chunks of storage space (e.g., 16 kB to 64 kB) in the cache window 305. Thus, when the cache 105 receives an I/O request, the cache 105 can compress the data, store the data in chunks in the cache windows 305, and keep track of that storage via metadata 310 stored at another location (e.g., within the cache 105-2).

The metadata may be routinely refreshed to show whether certain chunks of data remain dirty and/or valid. Thus, when the first cache 105-1 fails, the I/O processor 102 can retrieve the metadata 310 and identify which chunks of data are dirty and/or valid. In this illustration, the cache window 305-3 of each of the caches 105-2-105-3 is divided into seven data chunks, labeled 1 through 7. Valid data chunks 302 are illustrated with crosshatching whereas dirty data chunks 301 are illustrated with diagonal single hatching lines. Invalid and clean data chunks have no hatching. The I/O processor 102 retrieves the metadata 310 on a cache window by cache window basis to locate chunks of dirty data 301 and/or chunks of valid data 302 and then stores them at similar locations in the third cache 105-3.

To illustrate, in response to detecting that cache 105-1 has failed, the I/O processor 102 retrieves the metadata 310. The I/O processor 102 then locates the chunk of dirty data 301 at the data chunk location 2 in the cache window 305-2 and copies that chunk of dirty data to the same data chunk location 2 in the cache window 305-3 based on the metadata. The same process is performed for the valid chunks of data 302 (e.g., the valid chunk of data 302 at data chunk location 3 in the cache window 305-2 is copied to the same data chunk location 3 in the cache window 305-2 in the third cache 105-3. The invalid chunks of data and the clean chunks of data (collectively data chunks 303 without hatching), however, are not transferred to ensure that storage of the data chunks 301 and 302 do not exceed the physical storage size of the cache 105-3.

FIG. 4 is a block diagram of three exemplary I/O caches 105 employing redundancy and RAID management. In this embodiment, the RAID management scheme is RAID 5. Thus, data is striped into data stripes and parity stripes in the cache windows 305. For example, in the cache window 305-1 of the cache 105-1, there is the first stripe of data, stripe 0. In the cache window 305-1 of the cache 105-2, there is the second stripe of the data, stripe 1. And, in the cache window 305-1 of the cache 105-3, there is the first stripe of parity, parity 0. The raid striping continues in this fashion throughout the last cache window 305-10 of the caches 105-1-105-3.

After some period of time, one of either of the cache 105-1 and cache 105-2 fails and in this example is rebuilt in the cache 105-3. In this regard, the processor 102 retrieves the metadata from the cache 105-2 and stores the metadata in the volatile memory 107. The processor 102 then rebuilds the valid chunks of data 302 and the dirty chunks of data 301 in the corresponding cache window 305 of the cache 105-3 using RAID 5 management techniques, leaving the invalid and clean data chunks in the caches 105-1 and 105-2. Again, the cache window 305-3 of each of the caches 105-1-105-3 is divided into seven data chunks, labeled 1 through 7. Valid data chunks 302 are illustrated with crosshatching whereas dirty data chunks 301 are illustrated with diagonal single hatching lines. Invalid and clean data chunks have no hatching. Clean and invalid data chunks are not rebuilt into the cache 105-3.

It should be understood that for RAID 1 data is read from one device and written to the new device where the data is being rebuilt. For RAID 5, data is read from existing devices and then XOR'd. The XOR'd output is written to the new device where the data is being rebuilt. However, other forms of RAID management may be used with the embodiments disclosed herein.

Although shown and described herein with a certain number of data chunks, cache windows 305, caches 105, data stripes, parity stripes, and the like, the invention is not intended to be limited to the exemplary drawing. Rather, the illustrations herein are merely intended to provide the reader with a rudimentary example so as to further the understanding of the inventive concepts herein.

FIG. 5 is a flowchart 400 of another exemplary process operable with the storage controller. In this embodiment, one of the caches 105 fails and the processor 102 then reads the metadata associated with that cache 105 on a cache window by cache window basis (e.g., the cache windows 305 of each of the caches 105 starting with the cache window 305-1 at the top of caches 105 until the last cache window 305-10 is read), in the process element 401, and copies that into the volatile memory 107. The processor 102 determines whether there is any metadata entries remaining, in the process element 402. When no further metadata entries exist in a cache window 305, the processor 102 then determines whether it is the last cache window 305, in the process element 403. If the last metadata entry of the last cache window 305 has been transferred, the processor determines that the rebuild is complete, in the process element 404. Otherwise, the processor 102 moves onto the next cache window, in the process element 406, to read the chunks of data thereof.

If metadata entries remain, the processor 102 fetches the next metadata entry corresponding to the next cache window 305, in the process element 405. Here, the processor 102 analyzes the individual data chunks of a cache window 305. The processor 102 examines the metadata associated with the cache window 305 and determines whether the metadata indicates at a particular data chunk location contains a data chunk that is valid or dirty, in the process element 406. If the data chunk is either clean or invalid, the processor 102 skips the data chunk, in the process element 407. The processor 102 then reads the next metadata entry of the cache window 305. If the data chunk is either dirty or valid, the processor 102 transfers that chunk of data into the second or backup cache 105, in the process element 408. Afterwards, the processor 102 moves to the next metadata entry in the volatile memory 107.

Figure 6:
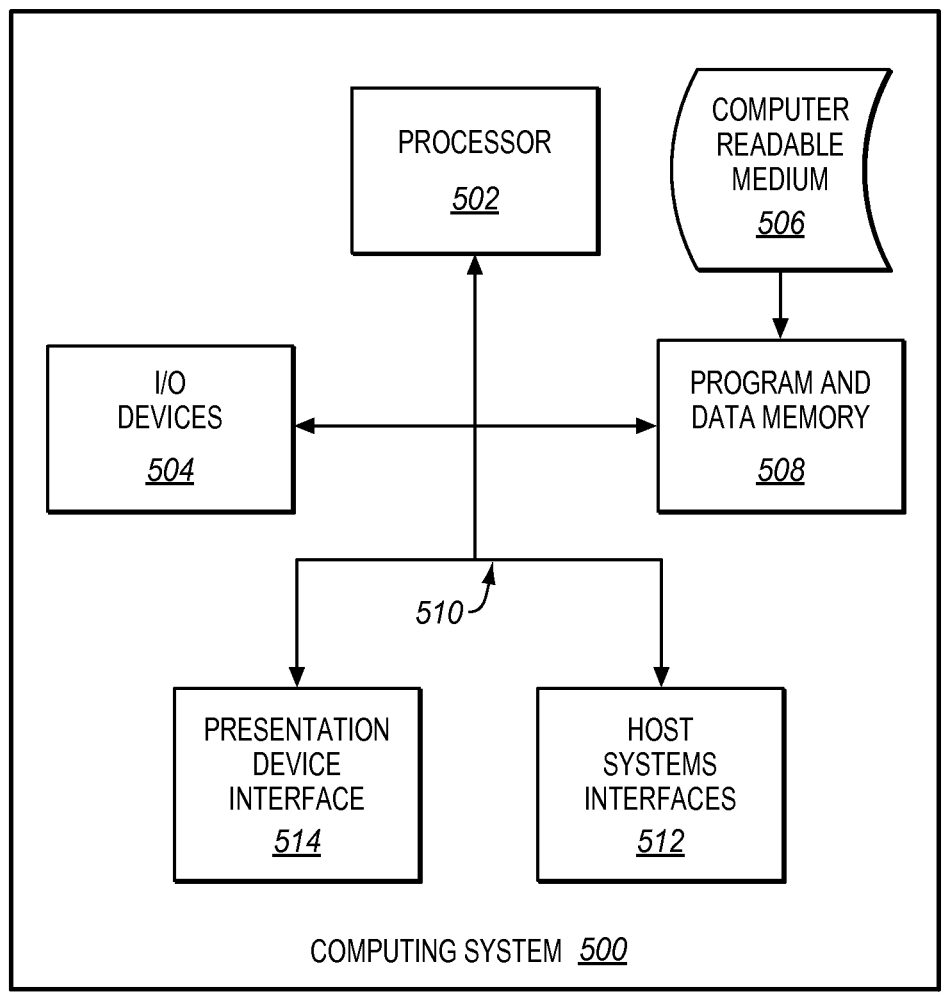
FIG. 6 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 500 in which a computer readable medium 506 may provide instructions for performing any of the methods disclosed herein.

Furthermore, the invention can take the form of a computer program product accessible from the computer readable medium 506 providing program code for use by or in connection with a computer or any instruction execution system. For the purposes of this description, the computer readable medium 506 can be any apparatus that can tangibly store the program for use by or in connection with the instruction execution system, apparatus, or device, including the computer system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the computing system 500 to become coupled to other data processing systems, such as through host systems interfaces 512, or remote printers or storage devices through intervening private or public networks. Modems, cable modem and Ethernet cards are just a few of the currently available types of network adapters.

What is claimed is:

1. A storage controller, comprising:
   a first cache operable to receive input/output requests between a host system and a storage device, to compress data of the input/output requests, and to cache the compressed data before writing to the storage device; and
   a second cache operable to:
   track chunks of the compressed data in the first cache; and,
   when the first cache fails, cache the tracked chunks of the compressed data that have not been written to the storage device in a third cache while leaving chunks of data in the second cache that have been written to the storage device.

2. The storage controller of claim 1, further comprising:
   a volatile memory operable to, when the first cache fails, store metadata associated with the chunks of the compressed data that have not been written to the storage device, the metadata being generated in response to tracking the chunks of the compressed data that have not been written to the storage device; and
   a processor operable to detect when the first cache fails, to retrieve the chunks of the compressed data that have not been written to the storage device from the second cache, and to direct caching of the chunks of the compressed data that have not been written to the storage device in the third cache.

3. The storage controller of claim 2, wherein:
the first cache and the second cache employ a Redundant Array of Independent Disks storage management of the compressed data.

4. The storage controller of claim 3, further comprising:
a fourth cache; and
wherein:
the first, second and third caches implement striping in accordance with the Redundant Array of Independent Disks; and
the processor is further operable to rebuild valid chunks of data of the first cache in the fourth cache based on parity chunks located in the second and third caches.

5. The storage controller of claim 1, wherein:
the first and the second caches are virtual caches configured from a same solid-state drive.

6. The storage controller of claim 1, wherein:
the first cache is configured from a first solid-state drive; and
the second cache is configured from a second solid-state drive.

7. A method operable in a storage controller, comprising:
with a first cache:
receiving input/output requests between a host system and a storage device;
compressing data of the input/output requests; and
caching the compressed data before writing to the storage device; and
with a second cache:
tracking chunks of the compressed data in the first cache; and
when the first cache fails, caching the tracked chunks of the compressed data that have not been written to the storage device in a third cache while leaving chunks of data in the second cache that have been written to the storage device.

8. The method of claim 7, further comprising:
when the first cache fails, storing metadata associated with the chunks of the compressed data that have not been written to the storage device in a volatile memory, the metadata being generated in response to tracking the chunks of the compressed data that have not been written to the storage device;
retrieving the chunks of the compressed data that have not been written to the storage device from the second cache; and
directing caching of the chunks of the compressed data that have not been written to the storage device in the third cache.

9. The method of claim 8, further comprising:
implementing a Redundant Array of Independent Disks storage management of the compressed data with the first and second caches.

10. The method of claim 9, further comprising:
implementing striping in accordance with the Redundant Array of Independent Disks in the first, second and third caches; and
rebuilding valid chunks of data of the first cache in a fourth cache based on parity chunks located in the second and third caches.

11. The method of claim 7, further comprising:
configuring the first and second caches from a same solid-state drive.

12. The method of claim 7, further comprising:
configuring the first cache from a first solid-state drive; and
configuring the second cache from a second solid-state drive.

13. A non-transitory computer readable medium comprising instructions that, when executed by a processor in a storage controller, direct the processor to:
with a first cache:
receive input/output requests between a host system and a storage device;
compress data of the input/output requests; and
cache the compressed data before writing to the storage device; and
with a second cache:
track chunks of the compressed data in the first cache; and
when the first cache fails, cache the tracked chunks of the compressed data that have not been written to the storage device in a third cache while leaving chunks of data in the second cache that have been written to the storage device.

14. The computer readable medium of claim 13, further comprising instructions that direct the processor to:
when the first cache fails, store metadata associated with the chunks of the compressed data that have not been written to the storage device in a volatile memory, the metadata being generated in response to tracking the chunks of the compressed data that have not been written to the storage device;
retrieve the chunks of the compressed data that have not been written to the storage device from the second cache; and
direct caching of the chunks of the compressed data that have not been written to the storage device in the third cache.

15. The computer readable medium claim 14, further comprising instructions that direct the processor to:
implement a Redundant Array of Independent Disks storage management of the compressed data with the first and second caches.

16. The computer readable medium of claim 15, further comprising instructions that direct the processor to:
implement striping in accordance with the Redundant Array of Independent Disks in the first, second and third caches; and
rebuild valid chunks of data of the first cache in a fourth cache based on parity chunks located in the second and third caches.

17. The computer readable medium of claim 13, further comprising instructions that direct the processor to:
configure the first and second caches from a same solid-state drive.

18. The computer readable medium of claim 13, further comprising instructions that direct the processor to:
configure the first cache from a first solid-state drive; and
configure the second cache from a second solid-state drive.

* * * * *